(12) United States Patent
Liu

(10) Patent No.: US 6,181,472 B1
(45) Date of Patent: Jan. 30, 2001

(54) METHOD AND SYSTEM FOR IMAGING AN OBJECT WITH A PLURALITY OF OPTICAL BEAMS

(75) Inventor: Kuo-Ching Liu, Setauket, NY (US)

(73) Assignee: Robotic Vision Systems, Inc., Hauppauge, NY (US)

( * ) Notice: Under 35 U.S.C. 154(b), the term of this patent shall be extended for 0 days.

(21) Appl. No.: 09/095,367

(22) Filed: Jun. 10, 1998

(51) Int. Cl.⁷ .................................................. G02B 27/10
(52) U.S. Cl. .......................... 359/618; 359/717; 359/719; 357/376
(58) Field of Search .................................. 359/717, 718, 359/719, 618; 356/376

(56) References Cited

U.S. PATENT DOCUMENTS

| | | | |
|---|---|---|---|
| 3,741,648 | 6/1973 | Nickel | 356/51 |
| 3,900,851 | 8/1975 | Bucy et al. | 346/49 |
| 4,000,493 | 12/1976 | Spaulding et al. | 346/1 |
| 4,449,212 | 5/1984 | Reno | 369/44 |
| 4,460,250 | 7/1984 | Freyre et al. | 350/358 |
| 4,541,694 | 9/1985 | Sullivan et al. | 350/371 |
| 4,575,191 | 3/1986 | Abramovitz | 350/358 |
| 4,624,534 | 11/1986 | Amano | 350/358 |
| 4,650,333 * | 3/1987 | Crabb et al. | 356/376 |
| 4,660,167 | 4/1987 | Casasent | 364/822 |
| 4,722,596 | 2/1988 | Labrum et al. | 350/358 |
| 4,725,855 | 2/1988 | Arimoto et al. | 346/108 |
| 4,867,542 | 9/1989 | Shimazu et al. | 350/358 |
| 4,974,943 | 12/1990 | Noguchi | 350/358 |
| 5,024,529 * | 6/1991 | Svetkoff et al. | 356/376 |
| 5,142,140 * | 8/1992 | Yamazaki et al. | 250/222.2 |
| 5,144,602 | 9/1992 | Kudoh et al. | 369/13 |
| 5,146,358 | 9/1992 | Brooks | 359/181 |
| 5,225,924 | 7/1993 | Ogawa et al. | 359/196 |
| 5,281,907 | 1/1994 | Hartup et al. | 324/76.37 |
| 5,347,124 * | 9/1994 | Narukawa et al. | 250/235 |
| 5,353,073 | 10/1994 | Kobayashi | 351/221 |
| 5,363,221 | 11/1994 | Sutton et al. | 359/11 |
| 5,457,567 | 10/1995 | Shinohara | 359/305 |
| 5,475,539 * | 12/1995 | Orii | 360/35 |
| 5,528,412 | 6/1996 | Shinada | 359/216 |
| 5,554,858 | 9/1996 | Costa et al. | 250/559.29 |
| 5,617,209 | 4/1997 | Svetkoff et al. | 356/376 |
| 5,633,747 | 5/1997 | Nikoonahad | 359/312 |
| 5,721,607 * | 2/1998 | Ota | 355/53 |
| 5,723,869 * | 3/1998 | Costa et al. | 250/559.29 |
| 5,815,275 * | 9/1998 | Svetkoff et al. | 356/376 |
| 5,859,924 | 1/1999 | Liu et al. | 382/145 |

* cited by examiner

Primary Examiner—Georgia Epps
Assistant Examiner—Tim Thompson
(74) Attorney, Agent, or Firm—Kenyon & Kenyon (57) ABSTRACT

A diffracting beam splitter splits an optical beam. The resulting beams are swept over an object by a beam deflector. The beams are mechanically scanned transverse to the beam deflection direction. A position sensitive device receives light reflected from the incident beams and a three dimensional profile of the object is produced.

37 Claims, 11 Drawing Sheets

METHOD AND SYSTEM FOR IMAGING AN OBJECT WITH A PLURALITY OF OPTICAL BEAMS

FIELD OF INVENTION

The present invention is directed to a method and system for imaging selected features of an object. In particular, the present invention is directed to collecting three-dimensional data concerning features of an object, and using such data to determine, for example, the dimensions and relative positions of the features.

BACKGROUND INFORMATION

The complexity of semiconductor chips has increased dramatically over the past several years. Such increased complexity has lead to an increase in the number of input and output leads or contacts required for each chip package. Further, with this increased complexity and the constant need to shorten chip production times, methods and systems for more rapid and accurate inspection of chip packages are needed.

Three dimensional laser beam sensor systems utilizing laser optical triangulation have been used to inspect chip packages. Such a system consists of a semiconductor diode laser, a beam deflector (for example, an acousto-optical (AO) deflector, also called an AO modulator) and a position sensitive device (PSD). The laser diode provides the light source for measurements. The beam deflector directs the laser beam to "sweep" the target object along a "sweep" direction. It will be observed that the terms "sweep" and "scan" may be used interchangeably. However, "sweep" will be used generally herein to refer to the specific "scanning" produced by a beam deflector, or AO deflector. Accordingly, to cover the entire target area, such systems typically rely on a mechanical scan, or translation, of the sensor system, or equivalently, the target object, in a direction perpendicular to the AO sweep direction. The PSD measures the height of the target object at each scan point and the data are stored until an image record for the entire object or a selected portion is collected. The stored image record may then be compared to a manufacturer's specification for the object or a selected portion to determine whether the object meets specification.

U.S. Pat. No. 5,554,858 issued to Costa et al. (the "'858 patent"), expressly incorporated herein by reference, describes one such system. A laser light source combined with an AO deflector is positioned to illuminate an object and sweep along the AO deflection direction while commercially available linear motion tables provide the transverse scanning translation. PSD sensors are positioned on both sides of the incident beam to receive light reflected from the sample and imaged into the PSDs by lenses. Further, the '858 patent describes use of multi-channel PSDs to collect the imaging data. A PSD provides an analog output current ratio proportional to the position of a light spot falling along its length. A multi-channel PSD has a segmented photosensitive area, the multiple segments comprising the multiple data channels. When used with a selective sampling technique, the multi-channel PSD can reduce the effect of stray or multipli-reflected light.

U.S. Pat. No. 5,859,924 to Liu et al. (the "'924 patent"), expressly incorporated herein by reference, describes another such system. The '924 patent describes another scanning system using optical triangulation techniques. This system uses a laser beam and AO deflector and one or more photosensitive devices to collect light reflected off-axially (from the axis of the incident light source) from the target object. Further, the system uses a polarizing beam splitter in the optical path of the incident beam to direct light reflected co-axially from the target object into a photo diode array for intensity measurement.

In conventional three-dimensional scanning systems such as the aforementioned, the AO deflecting swath is limited by the finite bandwidth of the AO device. An AO device deflects an optical beam by having an ultrasonic sound wave applied by piezo-electric signal transducers to a suitable crystalline material. The resultant sound wave in the crystal produces a periodic variation in the crystal's index of refraction which is used to diffract a fraction of an incident beam of monochromatic light. This fraction of the incident beam of monochromatic light is called the first order diffracted output. If no RF signal is applied, only the zero order non-diffracted incident beam will exit from the AO device.

The angle of diffraction $\theta$ of the first order output from the incident beam direction is given approximately by:

$$\theta = \frac{\lambda f}{V} \qquad (1)$$

where $\lambda$ is the wavelength of the incident beam measured in air, $f$ is the ultrasonic frequency of the sound wave, and $V$ is the ultrasonic velocity of the sound wave. Those skilled in the art will appreciate from equation (1) that the diffraction angle $\theta$ varies directly with the ultrasonic frequency $f$. Therefore, since the process is linear, an AO diffraction angle range or "sweep angle" range, $\Delta\theta$, is proportional to a change in the ultrasonic frequency, $\Delta f$, according to:

$$\Delta\theta = \frac{\lambda \Delta f}{V} \qquad (2)$$

The first order output can be quickly "swept" through the AO sweep angle range by continuously changing the ultrasonic drive frequency to the AO deflector. Equation (2) shows that the maximum AO sweep angle range is limited by the bandwidth, or range of frequencies, which can be used with the AO deflector. Thus, the smaller the AO bandwidth, the smaller the concomitant AO sweep angle range and the more mechanical scans required to complete a given area measurement. For example, to cover a 12"×8" ball grid array tray or an 8" flip chip wafer with an AO deflector scanning with a single beam, several hundred parallel mechanical scans might be required.

Other beam deflectors such as rotating polygonal scanners or galvanometer mirrors can also sweep a beam through a finite angle in a finite time. The speed limitations of these devices similarly impose a speed constraint on the operation of any scanning system in which they function.

Further, the speed of a system using a conventional PSD will be limited by the design and physical parameters of the PSD and its associated electronics. A current state-of-the-art PSD may have rise and fall times of a few hundred nanoseconds each. Therefore, the maximum throughput from a real time 3D sensor is limited by the bandwidths of both the AO deflector and the PSD.

SUMMARY OF THE INVENTION

The present invention is directed to a system for quickly and accurately measuring features of objects. In an exemplary embodiment, a system is provided that simultaneously scans with and collects data from multiple laser beams incident upon the target object. Specifically, multiple laser beams are swept across a sample by a beam deflector and the multiple reflected beams are imaged into one or more PSDs for determination of a 3D profile of the target object.

In accordance with the exemplary embodiment of the present invention, the light source is first transmitted through a beam deflector. The thus deflected beam is then directed to a diffracting beam splitter (DBS), also known in the art as a diffraction grating. The DBS is designed to diffract the beam into multiple orders. The resulting multiple beams are focused upon the target object to form multiple spots at the points of impingement at known X-Y positions on the object. The multiple laser beams are reflected by the object and this reflected light is imaged onto one or more multi-channel PSDs.

If an AO deflector is used with a DBS, for example, and the devices are chosen such that the separation of adjacent diffraction orders of the DBS is equal to or slightly smaller than the AO sweep angle range, $\Delta\theta$, then there will be continuous angular coverage by the laser scan. The overall angular coverage of the combined devices will be "n" times $\Delta\theta$, where "n" is the total number of diffraction orders produced by the DBS including the zeroth order. A typical DBS is fabricated by a lithography technique with a computer generated mask. A commercial DBS may have from a few up to several tens of diffracting orders with a dot pattern uniform in both space and energy distribution. Therefore, the present exemplary embodiment of the invention provides multiple evenly separated laser spots scanning synchronously across the target.

Analog signals generated by the one or more PSDs are related to the position(s) where the reflected light is focused on to the PSDs. These signals are used to calculate the Z coordinates of the object (i.e., the height) at the points of impingement of the source laser beams on the object. These coordinates are calculated using standard optical triangulation principles. The three-dimensional (3D) information can then be compared to manufacturer's specifications for a packaged device to determine if, for example, each solder ball or bump on a device such as a ball grid array, is the correct height. Additionally, the information can be used for determining co-planarity of the ball tops and/or warpage of the substrate.

BRIEF DESCRIPTION OF THE DRAWINGS

The foregoing and other features of the present invention will be more readily apparent from the following detailed description of exemplary embodiments taken in conjunction with the attached drawings wherein.

DETAILED DESCRIPTION

Prior Art Scanning Systems

Figure 1:
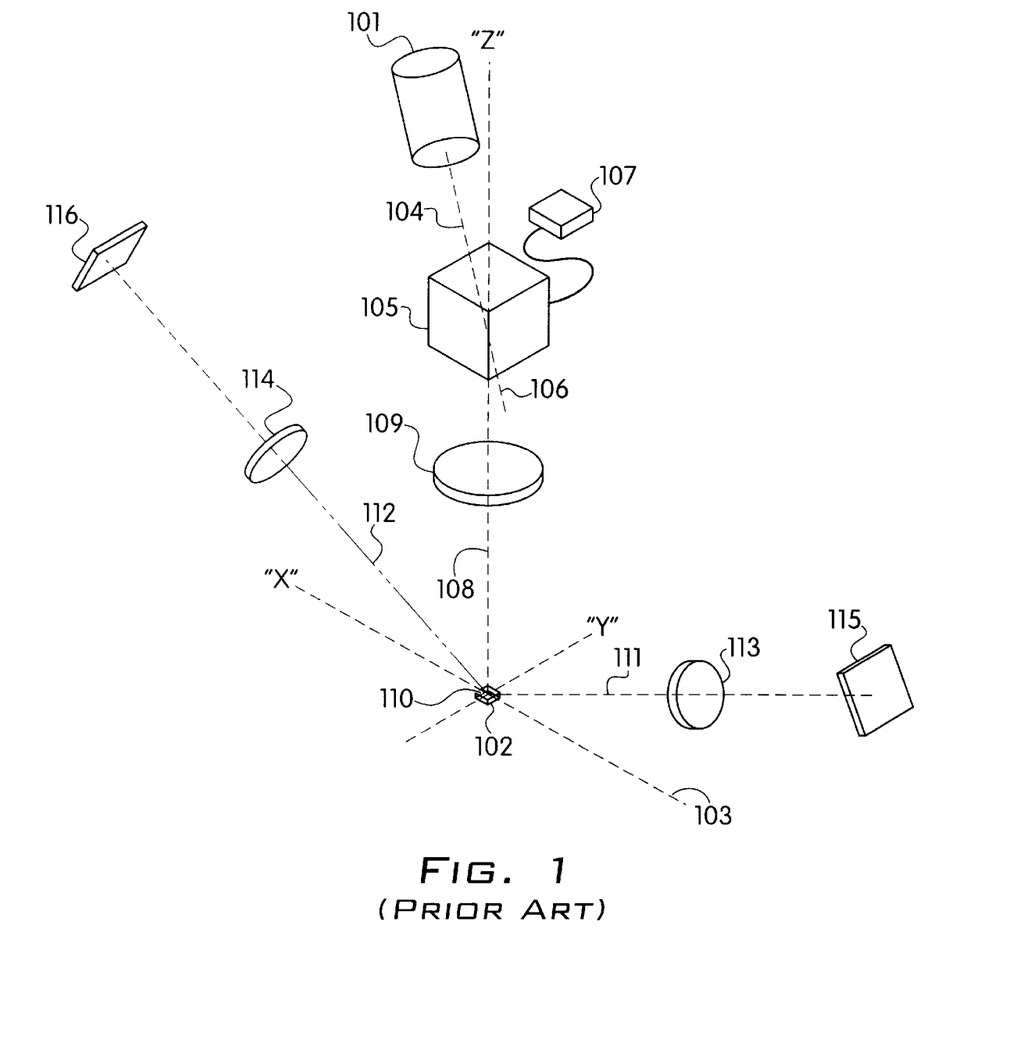
FIG. 1 is a diagram of a prior art scanning system using a single channel PSD system.

Referring now to the drawings, and initially FIG. 1, there is illustrated a typical prior art scanning system. A source of light, laser 101, is positioned to scan object 102 located in object plane 103. A laser beam 104 from laser 101 is directed through an AO modulator 105. A stationary zero order beam 106 exits from AO modulator 105 and is discarded. When driven by RF signal source 107, a first order deflected beam 108 emerges in the Y-Z plane from AO modulator 105 and is focused through optical system 109 to impinge at a spot 110 on object 102. When driven by a continuously frequency shifted R.F. signal source 107, beam 108 sweeps a finite line segment on object 102 (which is not shown for convenience) along Y in the X-Y plane. The laser beam 108 is scattered from object 102. Scattered light 111 and 112 are collected by optical systems 113 and 114 respectively and focused onto respective single channel PSDs 115 and 116. The image height (Z-coordinate) is then calculated based on where the focused reflected light impinges the PSD using standard optical laser triangulation techniques. The finite line segment swept by the beam 108 is mechanically scanned in the X-direction, perpendicular to the AO modulator 105 scan direction in Y, to collect 3-D data for all the desired regions of the object 102. Such a system is limited in its collection speed by the scan speed and scan angle of AO modulator 105 and the response time of the two PSDs 115 and 116.

Figure 2:
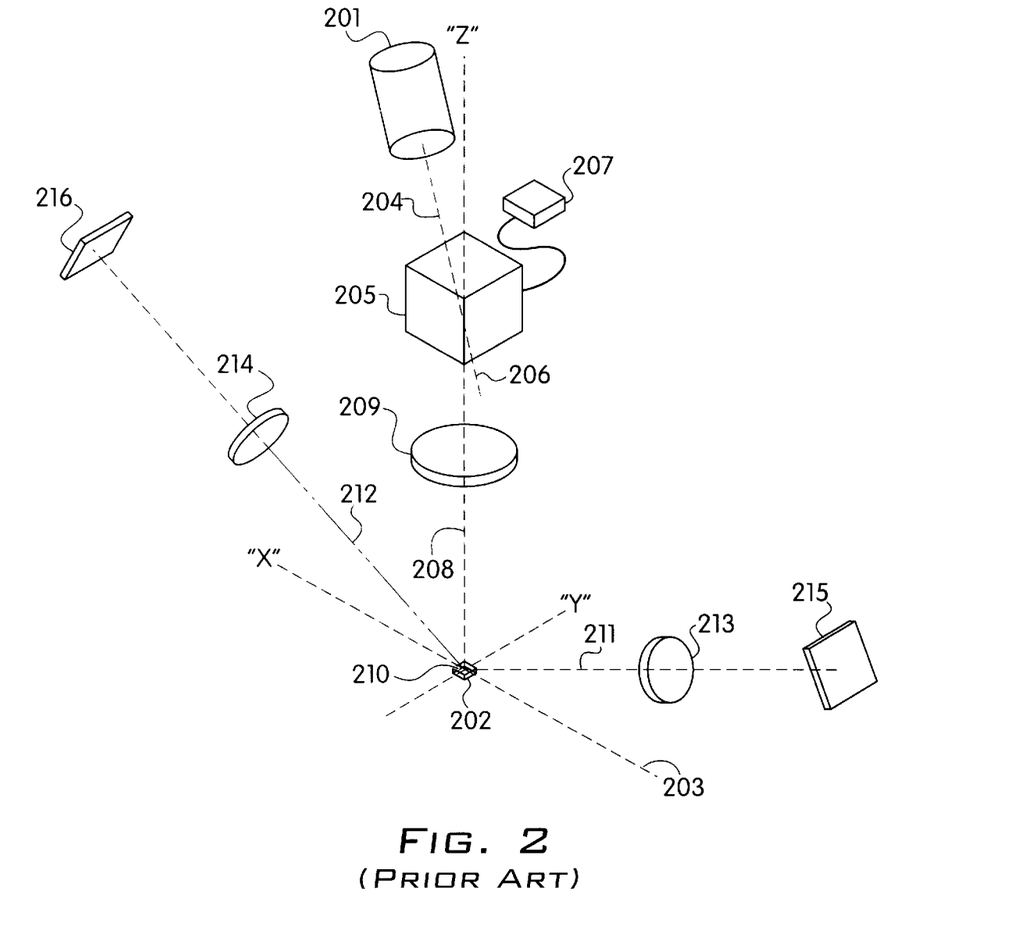
FIG. 2 is a diagram of a prior art scanning system using a multi-channel PSD.

A similar prior art scanning system is shown in FIG. 2. This system differs from that of FIG. 1 only in that PSDs 215 and 216 are multi-channel units as described in the '858 patent. Such a system is also limited by the scan speed and angle of AO modulator 205.

Figure 3:
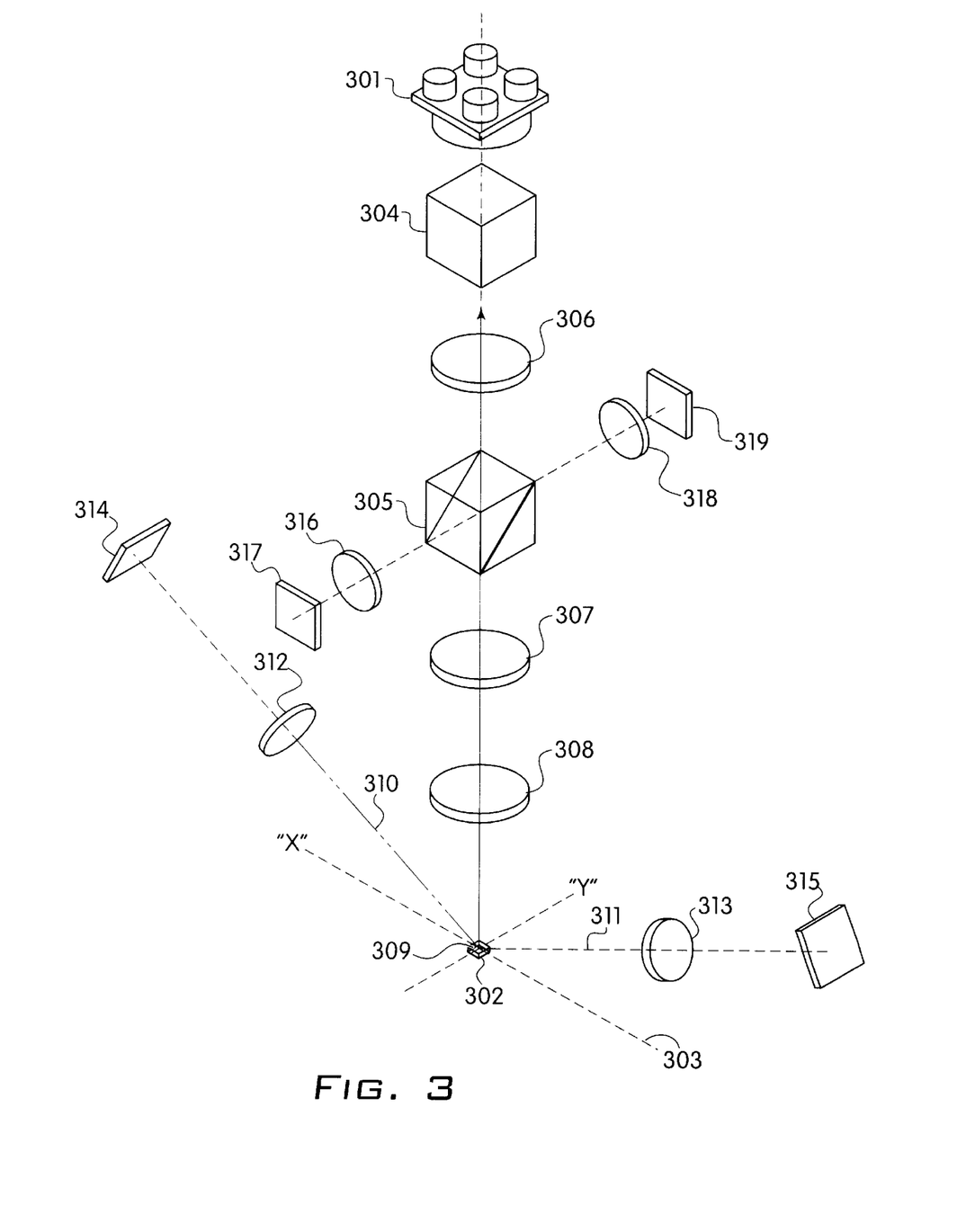
FIG. 3 is a diagram of a prior art system using a polarizing beam splitter in combination with several photosensitive detectors, in addition to the position sensing detectors.

A third prior art scanning system is illustrated in FIG. 3. A light source 301 is positioned by a motion system not shown to illuminate an object 302. Light, e.g., a laser beam 303, is directed to an AO deflector 304 which selectively deflects the laser beam 303 in its first (or alternatively minus first) order. The undeflected zero order is ignored in the figure. The motion system combined with the AO deflector allow the scanning system to scan a selected region of the object 302.

From the AO deflector 304, the laser beam 303 is directed to a polarizing beam splitter 305 through an optical system 306 (comprised of, e.g., two plano-convex cylindrical lenses, and a half wave plate). The polarizing beam splitter 305 reflects light that is polarized in the X direction. Since the laser beam 303 has polarization that is primarily in the Y direction, most of the laser beam 303 will pass through the beam splitter 305. (A small portion of laser beam 303 is directed to photo diode array 319 for optional normalization.) From the beam splitter 305, the laser beam 303 passes through a quarter wave plate 307 (which changes the linear polarized light to a circular polarization), and is focused and directed through an optical system 308 to form a focused spot 309 at the point of impingement on the object 302 at a known X-Y position.

The laser beam 303 impinging the object 302 at focused spot 309 is reflected. The light reflected off-axially with respect to the laser beam 303 (310, 311) is focused through two optical systems 312 and 313 (each comprised of, e.g., two lenses) on to two photo sensitive devices, such as PSDs 314 and 315. Analog signals generated by the PSDs 314 and 315 related to the detected position where the reflected light impinged the PSDs 314 and 315 are transmitted to process electronics not shown.

Retro-reflected light is also detected and measured (simultaneously with collecting the 3D data). In particular, light reflected from the focused spot 309 back toward the light source 301, i.e., retro-reflected light, is focused and directed through optical system 308 and quarter wave plate 307 to beam splitter 305. The quarter wave plate 307 changes the polarization of the retro-reflected light to a linear polarization and the polarization is in the X direction. Accordingly, beam splitter 305 reflects the retro-reflected light through an optical system 316 (comprised of, e.g., an achromatic lens) onto a photo diode array 317. The analog signals generated by the photo diode array 317 related to the intensity of light impinging the photo diode array 317 and the optional normalization photo diode 319 intensity are transmitted to the process electronics.

The analog signals from the photo sensitive devices, i.e., PSDs 314 and 315, and photo diode arrays 317 and 319 are processed and analyzed by process electronics and a computer not shown. In particular, the analog signals are converted to digital signals (via an A/D convertor). Z coordinates are determined from the data received from the PSDs 314 and 315 as described above. The data collected from photo diode array 319 (i.e., representing the intensity of the source laser beam) is used to normalize the data collected by photo diode array 317 (in order to maintain the accuracy of the data in the event of fluctuating laser output). The process electronics not shown then assembles data from the photo diode arrays 317 and 319, the Z coordinates, and the X and Y positions into data packets and transmits the packets to the computer. The computer receives the packets and calculates an X-Y-Z profile of the object 302.

This prior art scanning system is also limited by the finite scan rate and angle of the AO deflector. It will also be observed that the polarizing beam splitter of this prior art system does not produce multiple beams for incidence upon the target object. Rather the polarizing beam splitter mainly serves to allow photo-detection of light retro-reflected from the target object co-axially with the incident laser beam.

Exemplary Embodiments

Figure 4:
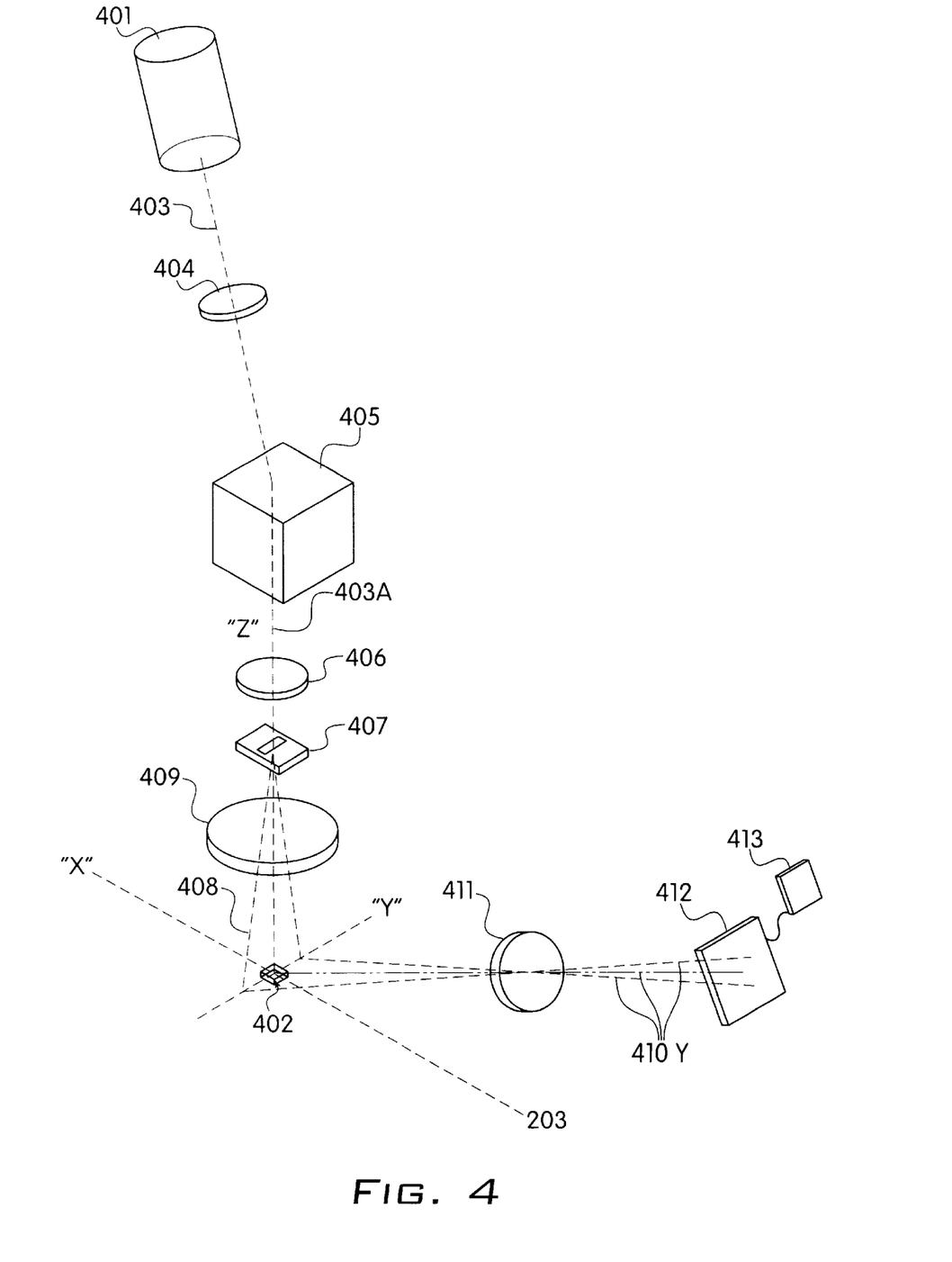
FIG. 4 is a diagram of an exemplary embodiment of the present invention.

FIG. 4 is a diagram of an exemplary embodiment of the present invention which overcomes several shortcomings of the prior art. A light source 401, e.g., a SDL-5400 semiconductor diode laser, wavelength=830 nm, with a TEM00 mode spatial distribution, is positioned by a motion system, not illustrated, to provide light for illumination of target object 402. A laser beam 403 from light source 401 is directed to optical system 404, e.g., af=5 mm lens, which collimates and directs the beam to an AO deflector 405. The first order deflected beam 403A from the AO deflector 405 scans through a finite sweep angle, e.g., 1.5 degrees, defined by the RF driving frequency (e.g., f=120 to 240 MHZ) and the deflector material, e.g., PbMoO$_4$. The undeflected zero order is ignored in the figure. The deflection of beam 403A with time is not illustrated in FIG. 3, i.e., the beam is depicted at one instant in the illustration. Optical system 406, e.g., a f=20 mm lens, images deflected beam 403 onto a diffraction beam splitter 407 (DBS). Optical system 406 is positioned such that AO deflector 405 and DBS 407 are at mutual conjugate planes so that the light to be deflected and diffracted is effectively at a common position.

The deflected (not illustrated) diffracted beams 408 are focused by optical system 409, e.g., a f=40 mm lens, onto target object 402. Optical system 411, e.g., a f=25 mm lens, images the reflected light 410 from each diffraction order into a separate PSD channel in the multi-channel PSD 412. In the exemplary embodiment, there are corresponding PSD channels for each diffraction order, e.g., if there are "n" laser beams 408 output from the DBS and incident on the target sample, there are "n" PSD channels. Of course, in other embodiments, some of the diffraction orders may be ignored. Multi-channel digital processor 413 receives signals from the multi-channel PSD 412 with each PSD channel's data being processed simultaneously by its own electronics. The motion mechanism (not illustrated) in combination with the AO deflector 405, precisely determines the X-Y position (and can quickly change the X-Y position) on the object 402 that the laser beams 408 impinge upon. The data results from each channel are combined to form an overall data file for completing the 3D measurements.

As noted above, a DBS with from a few to many tens of output orders is available from commercial sources. Therefore, "n" may correspondingly be from a few to many tens to match the DBS output. The figures illustrate the use of low order DBS units for simplicity only and are not meant to limit the possible embodiments of the invention.

Figure 5:
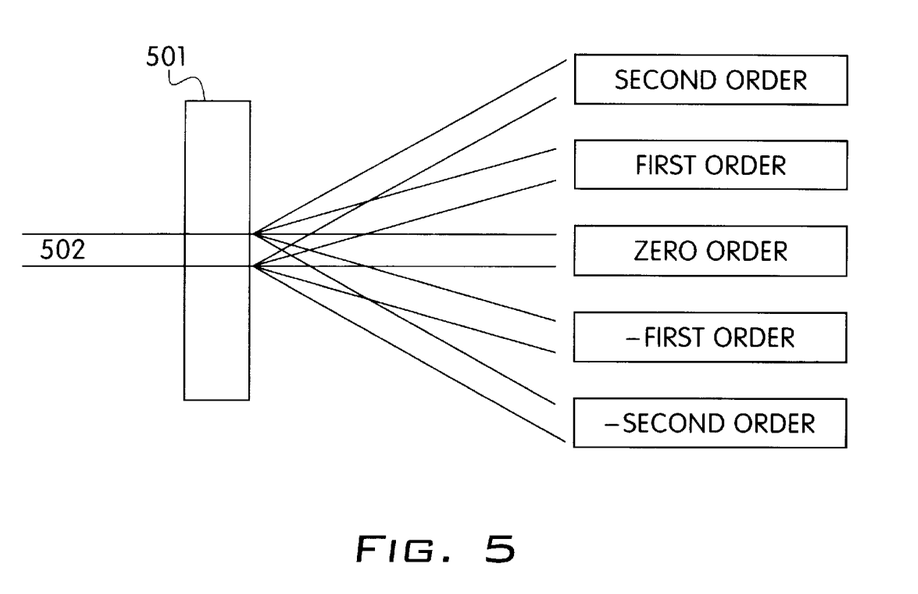
FIG. 5 illustrates the effect of a diffracting beam splitter (DBS) upon an incident laser beam.
Figure 6:
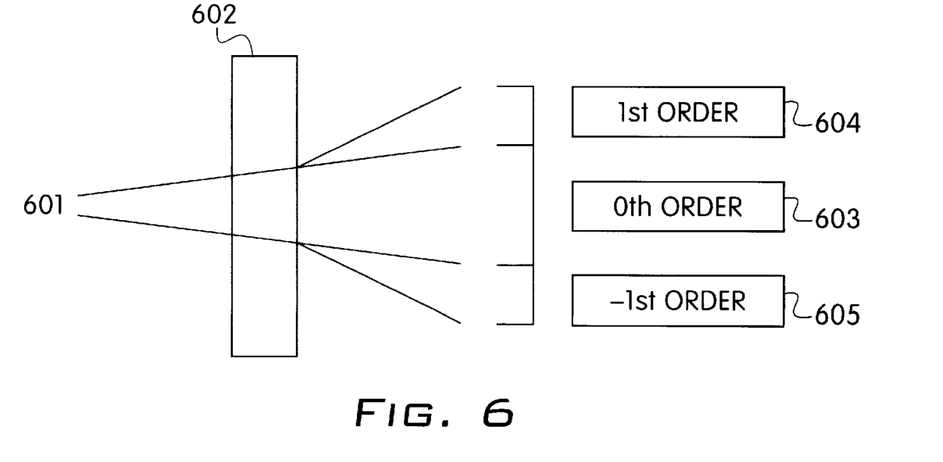
FIG. 6 illustrates the effect of an acousto-optical (AO) deflector and a DBS on an incident laser beam.

FIG. 5 illustrates the effect of a DBS 501 upon an incident laser beam 502. The figure shows the single incident beam split into five output beams (±two orders and a zero order). FIG. 6 illustrates the effect of directing the AO deflected beam into a DBS for three output beams. Deflected beam 601 is incident upon DBS 602 where the AO deflector (not shown) and DBS 602 have been chosen so that the diffracted beam angular separation between adjacent diffracted orders is substantially equal to the scan angle (shown as the zeroth order 603 of DBS 602) of the AO deflected beam 601. FIG. 6 shows the continuity of coverage of the plus first order 604, zeroth order 603 and minus first order 605. Accordingly, the deflected diffracted beam sweeps out continuous angular coverage in the target AO scan direction.

Figure 7:
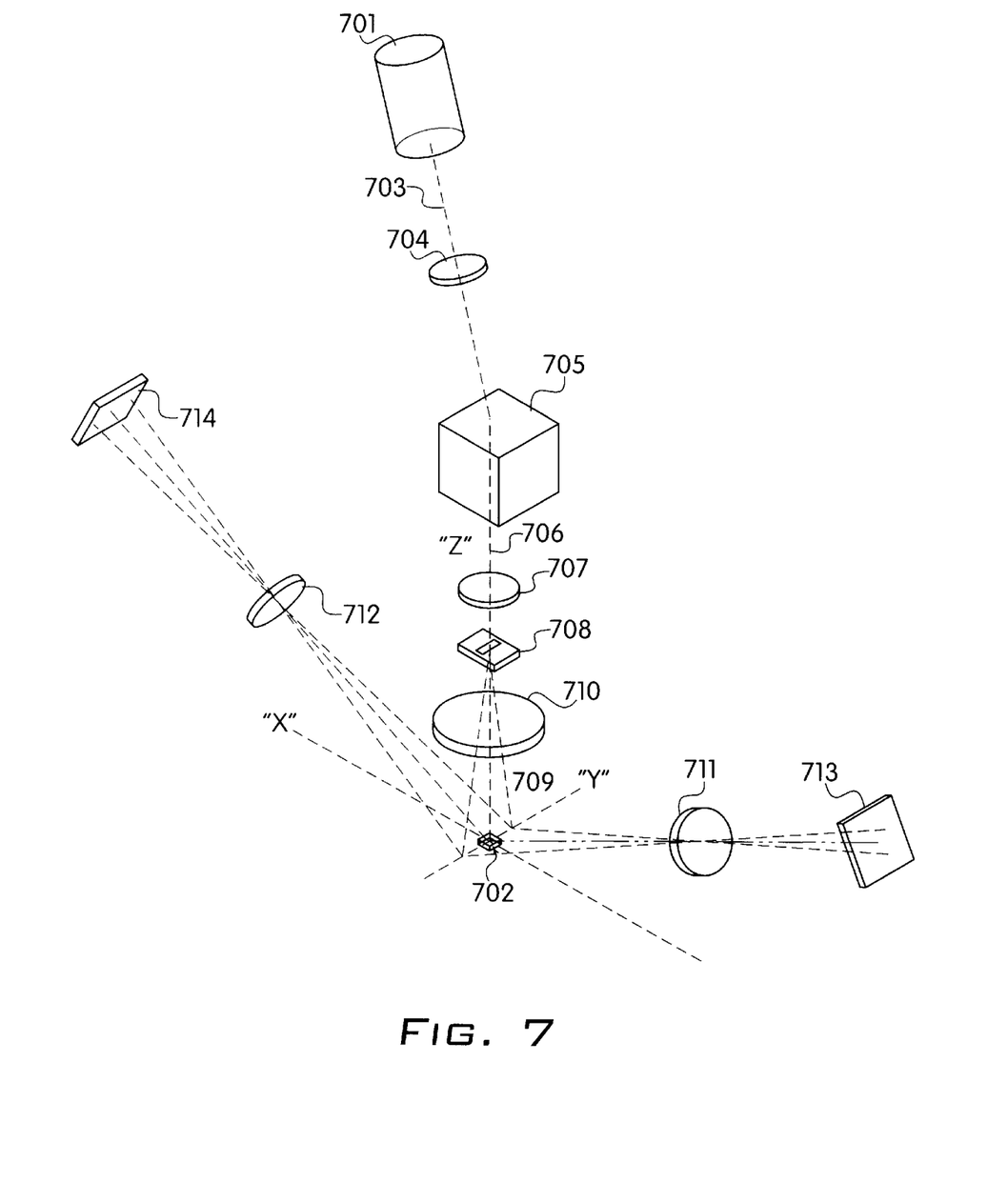
FIG. 7 is a diagram of a second exemplary embodiment of the present invention.

FIG. 7 illustrates another exemplary embodiment of the invention. A light source 701 is positioned to provide light for illumination of object 702. Light beam 703 from light source 701 is directed to optical system 704, e.g., a f=50 mm lens which collimates and directs the beam to AO deflector 705. First order deflected beam 706 is focused by optical system 707 onto DBS 708. The undeflected zero order beam, not shown, is unused. DBS 708 splits the beam into, e.g., three orders, as shown. The resulting multiple beams 709 are directed by optical system 710 to impinge on target object 702. The reflected light is imaged by optical systems 711 and 712, e.g., f=25 mm lenses, into multi-channel PSDs 713 and 714 respectively. The multiple multi-channel PSD data is handled in a manner as described above with FIG. 4 to form a data file for 3D measurements.

In a further embodiment, the beam splitter may be a partially reflective mirror, e.g., a dielectric coated mirror or a partially metallized mirror, or a system of one or more of these in combination. Any arrangement of optical elements which is capable of producing from a single input beam, multiple optical beams for incidence upon a target object would be embraced within the scope and spirit of the term "beam splitter" as used in this invention. In an exemplary embodiment (not illustrated) utilizing a single dielectric coated mirror, the mirror is placed at an angle to the incident beam so that two output beams with appropriate angular separation are produced and further directed substantially as described with regard to the other embodiments herein. Selection and arrangement of appropriately coated mirror elements would be a routine matter for those of ordinary skill in the art with the benefit of this disclosure.

In a further embodiment, instead of an AO deflector, the beam deflector is a rotating polygonal scanner or a galvanometer mirror. Each of these beam deflectors has a respective finite sweep angle. One of ordinary skill in the art with the aid of this disclosure would be able to select a beam deflector and a DBS to provide continuous angular scanning coverage in the target beam deflection direction in accord with the present invention.

In a further embodiment, the PSD(s) may be replaced with charge coupled device (CCD) array(s). External clock pulses are used to read out the photocharge on the CCD(s) in a manner known to the art.

In yet a further embodiment, the CCD(s) may be replaced with capacitive metal-oxide semiconductor (CMOS) device array(s) which allow random addressability of the data pixels. The light intensity distribution on the CMOS array may be measured from the grey scale level of the pixel array. The target height may be found from the light distribution from either a local maximum or from the highest gradient value. Since the CMOS array allows readout of arbitrary rows or individual pixels, by correlating the beam scan position with the CMOS imaging location for each incident laser spot, the height may be determined from only one row of the pixel array.

Determination of Object Height

Figure 8:
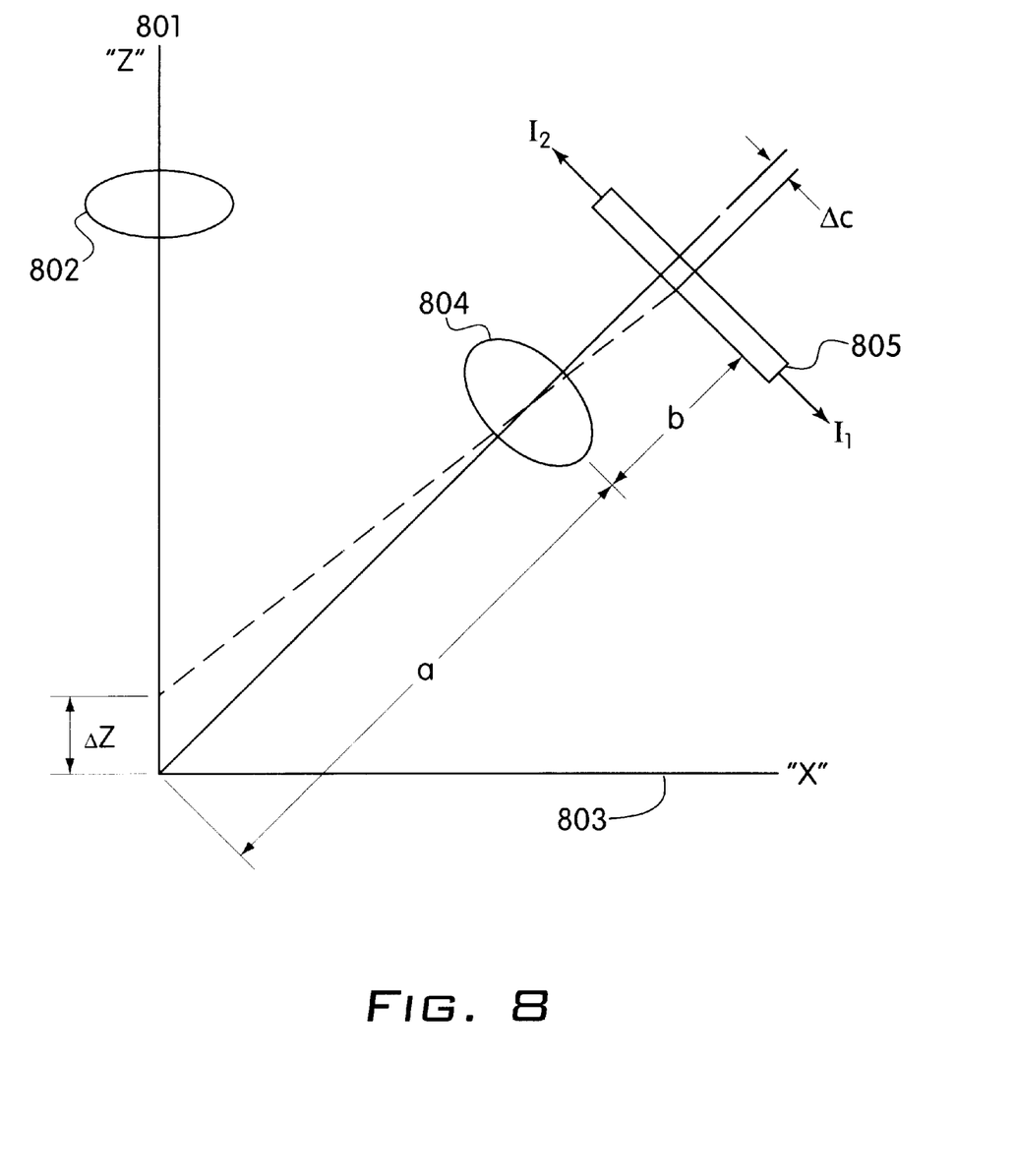
FIG. 8 illustrates the imaging of object height onto a photodetector for optical triangulation.
Figure 9:
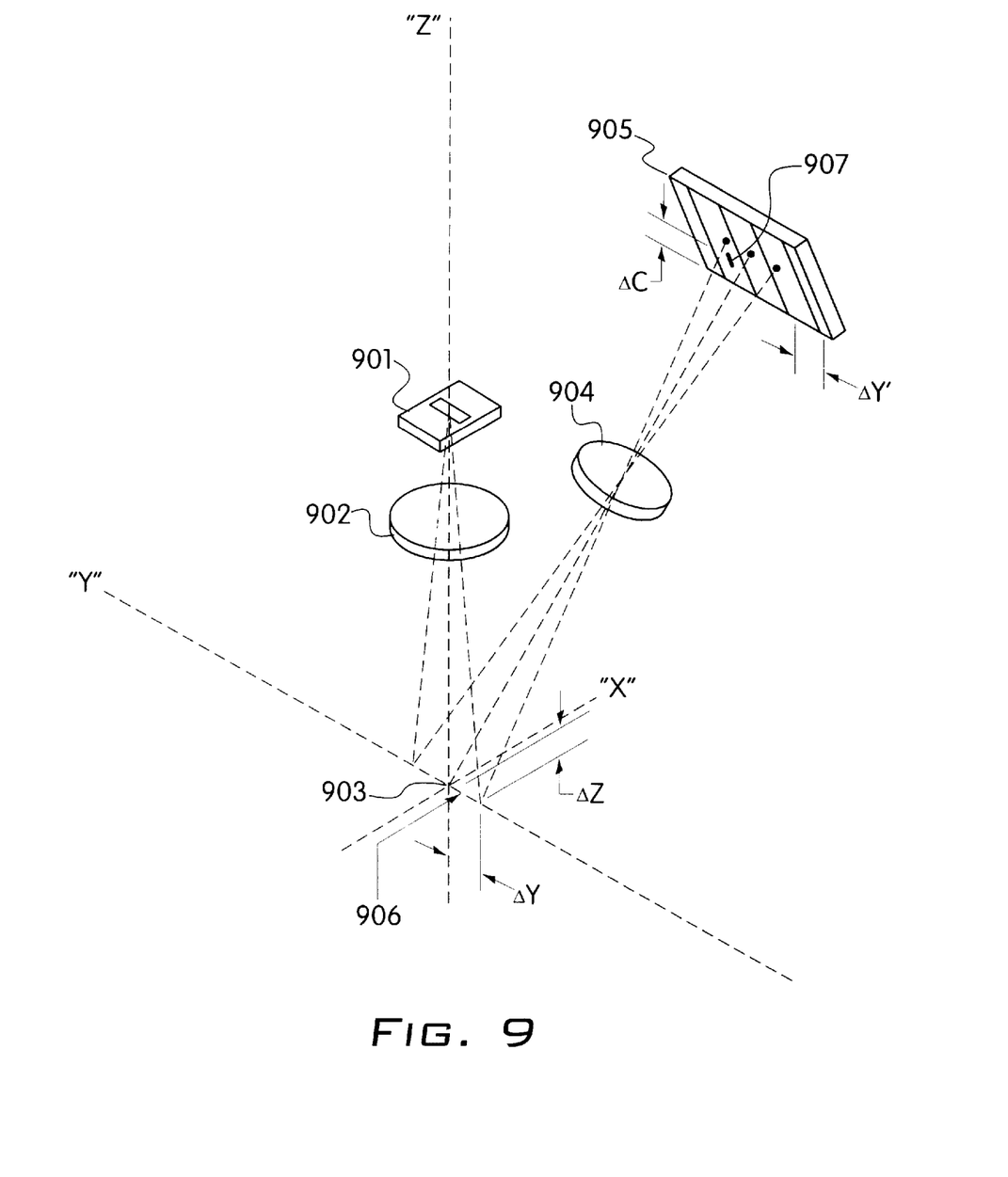
FIG. 9 depicts the imaging of multiple reflected laser beams onto a multi-channel PSD.

The principles of optical triangulation as applied to determination of object height (Z height) data with a multi-channel PSD are illustrated schematically in FIG. 8 and FIG. 9. A laser beam 801 is focused by optical system 802 to impinge upon an object whose base rests in target plane 803. The scattered light from the object is focused by optical system 804 onto a photodetector, e.g., a single channel PSD 805. The desired data is target height $\Delta Z$. Angle $\theta$ is the separation angle between the incident laser beam 801 and the viewing axis of optical system 804. When the object height in FIG. 8 is $\Delta Z$ along the Z axis, the image displacement of the intensity centroid on PSD 805 is $\Delta C$ (for centroid) in accord with basic principles of geometrical optics. In FIG. 8, a and b are the separations between optical system 804 and, respectively, the object base position in target plane 803, and PSD 805. Based on the imaging formula for a thin lens, $\Delta Z$ and $\Delta C$ are related according to:

$$\Delta Z = \frac{a(\Delta C)}{b\sin\theta + (\Delta C)\cos\theta} \quad (3)$$

PSD 805 produces two photocurrents whose relative values $I_1$ and $I_2$ are related to the displacement $\&C$ in the image plane on PSD 805 in a manner understood by those of ordinary skill in the art. Specifically, $\Delta C$ can be determined from the normalized differential photocurrent of PSD 805 from the equation:

$$\Delta C = \frac{I_1 - I_2}{I_1 + I_2} \quad (4)$$

Accordingly, the height of the object $\Delta Z$ can be measured with the arrangement of triangulation optics and detection as shown herein.

Figure 10:
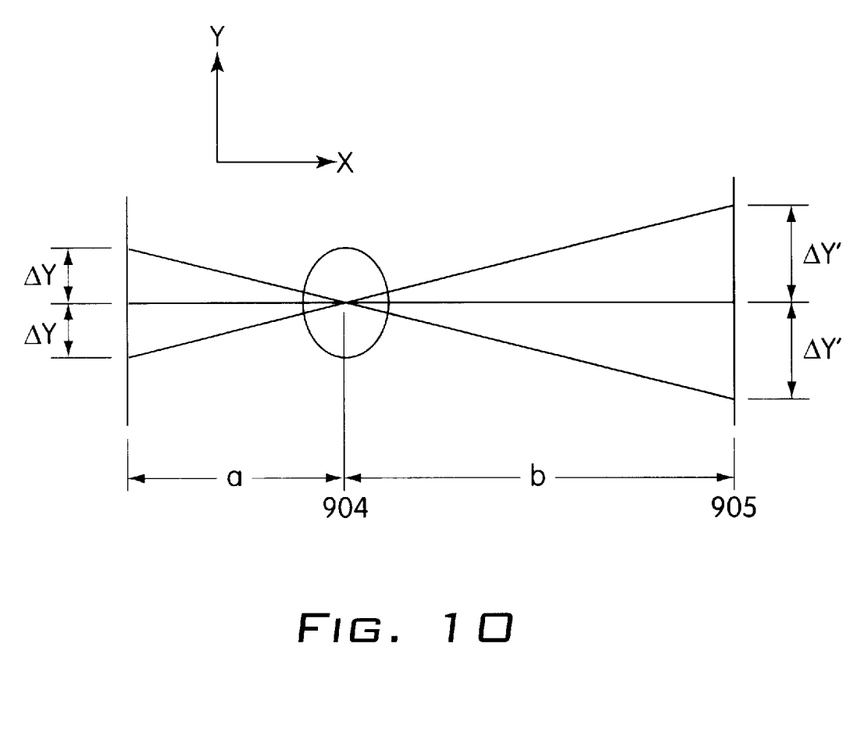
FIG. 10 depicts detail of the imaging of multiple reflected laser beams onto a multi-channel PSD.

FIG. 9 and FIG. 10 schematically illustrate the extension of the technique of FIG. 8 to multiple incident laser beams as shown in an exemplary embodiment of the invention. Multiple laser beams exit DBS 901 and are focused by optical system 902 onto object 903. The laser beams are separated by uniform spacing $\Delta Y$ in the Y direction. The scattered light from each incident spot is focused by optical system 904 onto photodetector 905, e.g., a multi-channel PSD. Each channel of the multi-channel PSD 905 detects light at a corresponding beam spot to determine the height at that spot when the channel separation $\Delta Y'$ is chosen such that:

$$\Delta Y' = \frac{b}{a}\Delta Y = M_0 \Delta Y \quad (5)$$

where $M_0$ is the optical magnification from the object surface to the photodetector plane. $\Delta Y$ is selected by choosing a combination of DBS and beam deflector as discussed above. The Z height $\Delta Z$ 906 at one object point is depicted as transformed by optical system 904 to its corresponding $\Delta C$ 907 on one channel of photodetector 905. Thus, with the $\Delta C$ data for each channel, $\Delta Z$ may be obtained simultaneously for each of the multiple channels in accord with the present invention.

Acquisition of 3D Data

Figure 11:
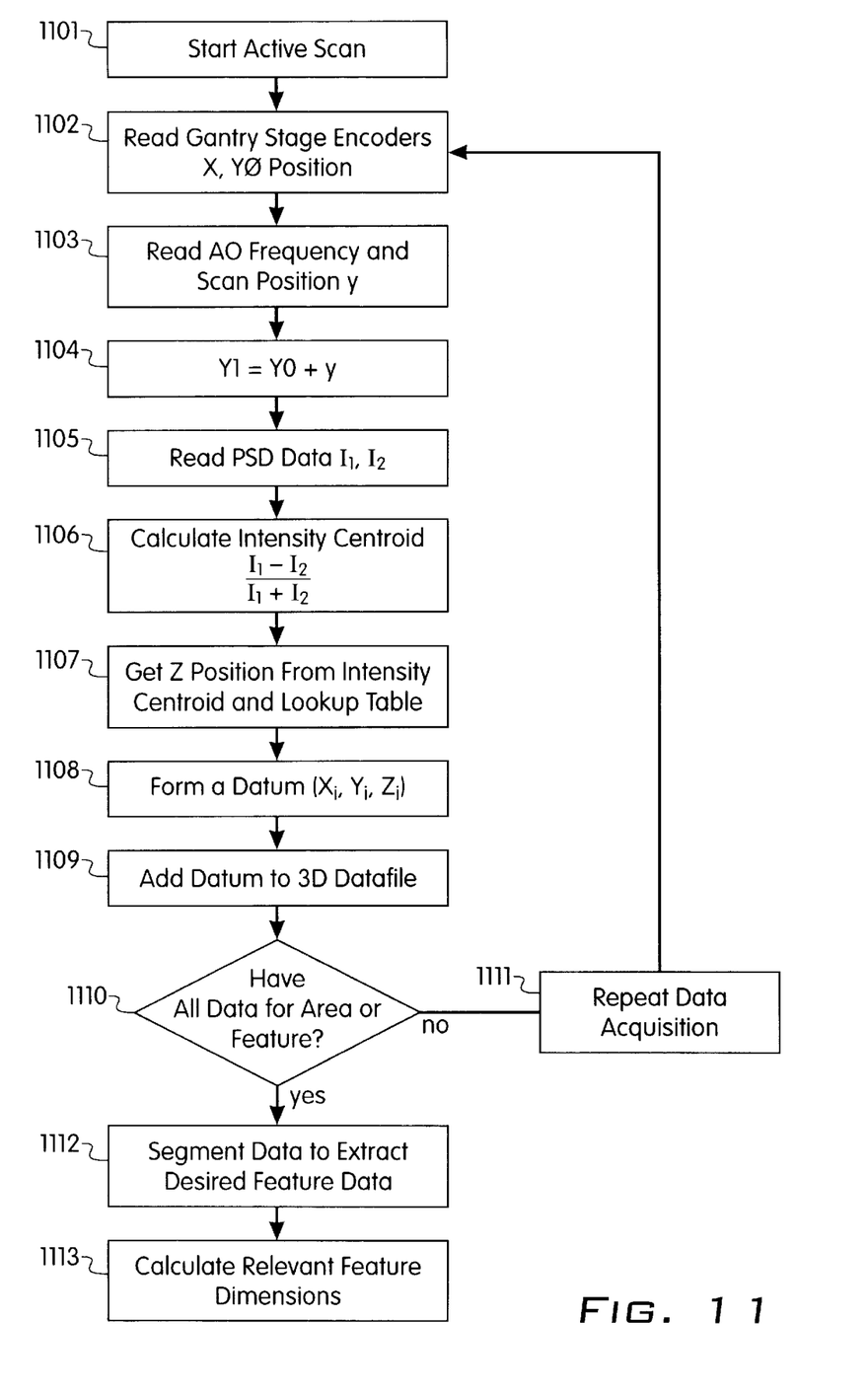
FIG. 11 is a flow chart of an embodiment of a method according to the invention.

A process for acquiring the 3D object data is described with reference to FIG. 11. FIG. 11 depicts the steps for acquiring data for a single channel PSD. When a multi-channel PSD is used, the steps of FIG. 11 are carried out in parallel for each channel. After the scan is started (step 1101), the gantry stage encoders are read (step 1102) to determine the X position and the initial Y position, Y0. The Y displacement, y, due to the beam deflector, e.g., an AO deflector, is read (step 1103). The combined Y position Y1, is calculated (step 1104) from the initial Y position, Y1, and the beam deflector Y displacement, y. The light intensity data is read (step 1105) from, e.g., the PSD channel. The detector plane intensity centroid C is calculated (step 1106) from the intensity data. The object height Z data is determined (step 1107) from the intensity centroid and a lookup table in accord with the analysis described with Equations 3 and 4 above. A datum of object X, Y, Z data, i.e., Z(X,Y), the object height at a given X,Y point, is formed (step 1108). The X, Y, Z datum is collected (step 1109) with other data in a 3D (X, Y, and Z) data file. The specific selection of the 3D data file format would be a routine matter of programming for those of ordinary skill in the art with the benefit of this disclosure. At a decision point (step 1110), it is determined whether all the desired data is acquired. If more data is required, the data acquisition is repeated (step 1111). If all required data is acquired, then the data may be segmented to extract the desired feature data (step 1112) and calculate relevant feature dimensions (step 1113).

Analysis of the 3D Data

Figure 12:
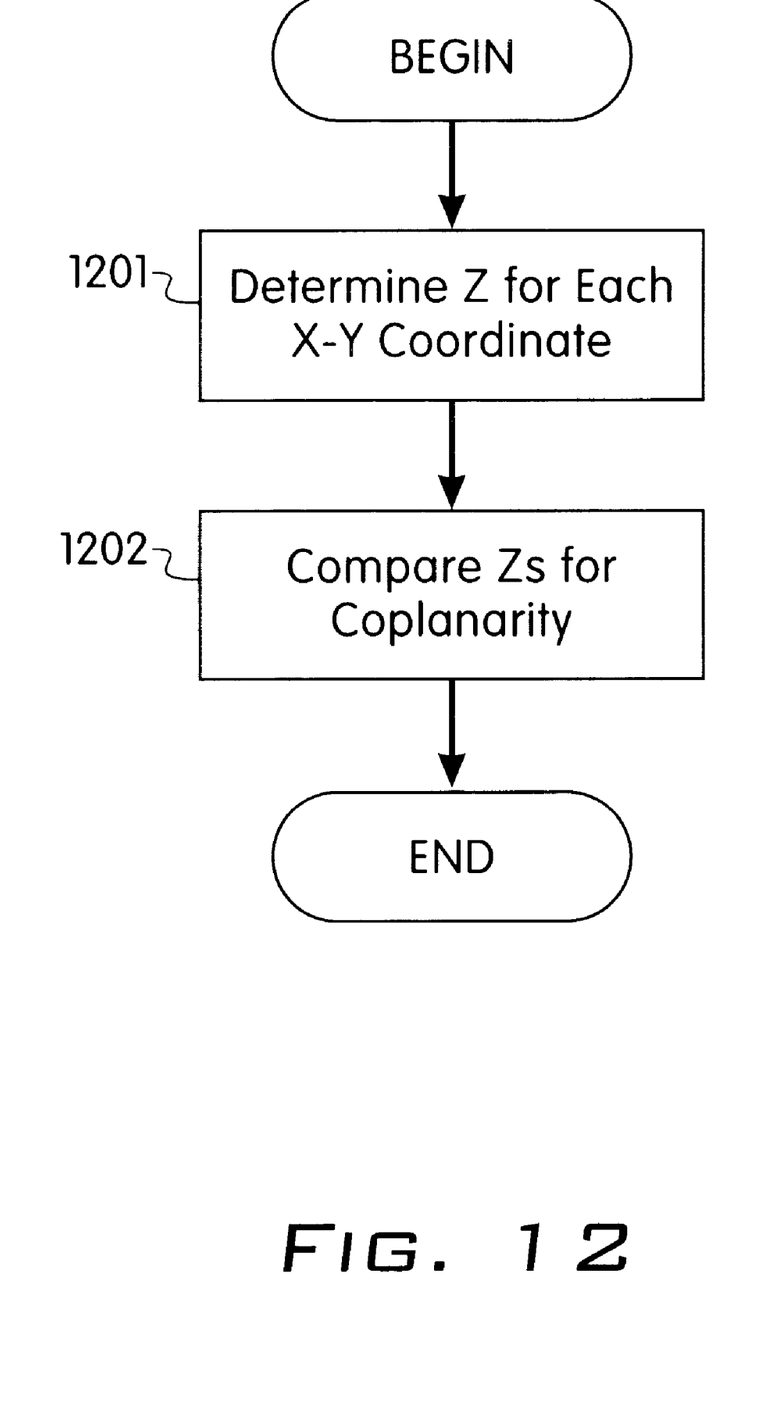
FIG. 12 depicts the steps in another embodiment of a method according to the invention.

In the representative embodiment of the present invention, the 3-D data is analyzed to determine, e.g, i) the height of each solder ball on a device; and ii) device co-planarity. Of course, other information regarding the object may also be determined from the data obtained. In accordance with the flowchart of FIG. 12, the data collected from, e.g., PSD 412 is used to determine the height (step 1201) of each solder ball in accordance with the optical triangulation techniques previously described. The respective image heights can then be compared to each other in order to determine, e.g., device co-planarity (step 1202). The '342 application incorporated by reference describes the segmenting and extraction of feature data in further detail.

While the present invention has been particularly shown and described with reference to particular embodiments thereof, it will be understood by those skilled in the art that various changes in form and details may be made therein without departing from the spirit and scope of the invention.

What is claimed is:

1. An imaging system comprising:
   a light source positioned to transmit light along a first path for illuminating an object;
   a beam deflector positioned along the first path;
   a beam splitter along the first path for splitting the light into a plurality of output paths for illuminating the object at a plurality of X-Y coordinates;
   a first photo sensitive device detecting light reflected from the object at the plurality of X-Y coordinates and generating a first at least one signal as a function of the light detected along a first at least one path; and
   a processor receiving the first at least one signal and generating an image of at least one portion of the object as a function of the received first at least one signal,
   wherein the beam splitter is a diffracting beam splitter.

2. The system of claim 1 wherein the beam deflector and the beam splitter are selected so that the angular separation of adjacent output paths of the beam splitter is substantially at most equal to the beam deflector sweep angle range.

3. The system of claim 2 wherein the beam deflector is an acousto-optical deflector.

4. The system of claim 2 wherein the light source is a diode laser.

5. The system of claim 2 wherein the beam deflector is a rotating polygonal scanner.

6. The system of claim 2 wherein the beam deflector is a galvanometer mirror.

7. The system of claim 2 wherein the first photo sensitive device is a multi-channel position sensitive device.

8. The system of claim 2 wherein the first photo sensitive device is a charge coupled device array.

9. The system of claim 2 wherein the first photo sensitive device is a capacitive metal oxide semiconductor device array.

10. The system of claim 2 further comprising:
    a second photo sensitive device detecting light reflected from the object at the plurality of X-Y coordinates and generating a second at least one signal as a function of the light detected along a second at least one path; and
    wherein the processor receives the second at least one signal and generates the image of at least a portion of the object as a function of the received first at least one signal and the second at least one signal.

11. The system of claim 10 wherein at least one of the first photo sensitive and the second photo sensitive device is a multi-channel position sensitive device.

12. The system of claim 10 wherein at least one of the first photo sensitive and the second photo sensitive device is a charge coupled device array.

13. The system of claim 10 wherein at least one of the first photo sensitive and the second photo sensitive device is a capacitive metal oxide semiconductor device array.

14. A method for imaging an object, comprising the steps of:
    projecting a first light beam from a light source;
    directing the first light beam through a beam deflector, the beam deflector deflecting the first light beam at a first selected deflection angle;
    directing the deflected first light beam through a beam splitter to produce a plurality of exit beams;
    illuminating the object at a plurality of X-Y coordinates with at least two of the plurality of exit beams;
    detecting simultaneously light reflected by the object from at least two of the plurality of X-Y coordinates; and
    generating a three dimensional image of at least one portion of the object as a function of the detected lights, wherein the beam splitter is a diffracting beam splitter.

15. The method of claim 14 wherein the beam splitter is selected so that the separation of adjacent exit beams is substantially at most equal to the sweep angle range of the beam deflector.

16. The method of claim 14 wherein the beam deflector is an acousto-optical deflector.

17. The method of claim 16 wherein the beam deflector is a rotating polygonal scanner.

18. The method of claim 14 wherein the beam deflector is a galvanometer mirror.

19. The method of claim 14 further comprising the step of:
    scanning the plurality of exit beams across the object in a direction perpendicular to the beam deflector sweep angle at predetermined time intervals.

20. The method of claim 19 wherein the scanning is accomplished by translation of the object.

21. The method of claim 14 further comprising the step of determining the dimensions of selected features from the three dimensional image.

22. The method of claim 14 further comprising the step of determining the relative positions of selected features from the three dimensional image.

23. The method of claim 14 further comprising the step of determining the relative co-planarity of selected features from the three dimensional image.

24. A method for scanning optical beams across an object comprising the steps of:
    projecting a first light beam from a light source;
    directing the first light beam through a beam deflector, the beam deflector deflecting the first light beam at a first selected deflection angle;
    directing the deflected first light beam through a beam splitter to produce a plurality of exit beams; and
    illuminating the object at a plurality of X-Y coordinates with at least two of the plurality of exit beams,
    wherein the sweep angle range is selected so that the separation of adjacent exit beams is substantially at most equal to the sweep angle range.

25. The method of claim 24 wherein the beam splitter is selected so that the separation of adjacent exit beams is substantially at most equal to the preselected sweep angle range of the beam deflector.

26. A method for imaging an object, comprising the steps of:
    projecting a first light beam from a light source;
    directing the first light beam through a beam deflector, the beam deflector deflecting the first light beam at a first preselected deflection angle;
    directing the deflected first light beam through a beam splitter to produce a plurality of exit beams;
    illuminating the object at a plurality of X-Y coordinates with at least two of the plurality of exit beams;
    detecting simultaneously light reflected by the object from at least two of the plurality of X-Y coordinates; and
    generating a three dimensional image of at least one portion of the object as a function of the detected light, wherein the sweep angle range is selected so that the separation of adjacent exit beams is substantially at most equal to the sweep angle range.

27. The method of claim 19 wherein the scanning is accomplished by translating the sensor system.

28. The method of claim 26 wherein the beam splitter is a diffracting beam splitter.

29. The method of claim 26 wherein the beam splitter comprises a partially reflective mirror.

30. The method of claim 26 wherein the beam deflector is an acousto-optical deflector.

31. The method of claim 26 wherein the beam deflector is a rotating polygonal scanner.

32. The method of claim 26 wherein the beam defector is a galvanometer mirror.

33. The method of claim 26 further comprising the step of:
scanning the plurality of exit beams across the object in a direction perpendicular to the beam deflector sweep angle at predetermined time intervals.

34. The method of claim 19 wherein the scanning is accomplished by translation of the object.

35. The method of claim 26 further comprising the step of determining the dimensions of selected features from the three dimensional image.

36. The method of claim 26 further comprising the step of determining the relative positions of selected features from the three dimensional image.

37. The method of claim 26 further comprising the step of determining the relative co-planarity of selected features from the three dimensional image.

* * * * *